Jan. 11, 1927.

E. FINSEN 1,613,880

APPARATUS FOR AND METHOD OF CUTTING GEARS

Filed Dec. 30, 1925

INVENTOR
Eyvind Finsen
BY
ATTORNEY

Patented Jan. 11, 1927.

1,613,880

UNITED STATES PATENT OFFICE.

EYVIND FINSEN, OF ROCHESTER, NEW YORK, ASSIGNOR TO GLEASON WORKS, OF ROCHESTER, NEW YORK, A CORPORATION OF NEW YORK.

APPARATUS FOR AND METHOD OF CUTTING GEARS.

Application filed December 30, 1925. Serial No. 78,401.

The present invention relates to a method and apparatus for cutting gears and particularly for cutting gears having longitudinally curved teeth.

The primary object of this invention is to improve methods and apparatus for cutting gears with the object of eliminating chatter during the cut and of producing gears having tooth surfaces of a very smooth finish.

Other objects of the invention will be apparent hereinafter from the specification and from the recitation of the appended claims.

In the accompanying drawings, there are shown two forms of apparatus suitable for practising this invention. It will be understood, however, that the invention is capable of further modification without departing from its spirit or the limits of the appended claims.

One of the sources of imperfection in the finish of the tooth surfaces of cut gears are chatter marks, caused by the chatter or vibration of the cutting tool as it makes its cut. This chatter or vibration is most frequently due to the shock of engagement of the cutting tool with the gear blank as it starts to cut. The impact of the rapidly moving tool against the solid blank tends to set up a vibration in the tool which may continue through the whole of the travel of the tool across the face of the blank and this vibration of the tool will produce a wavy or chatter marked tooth surface. Chatter marking is more apt to occur in the cutting of non-generated gears, where the contact of the tool with the tooth surface being cut is a line contact, than in the cutting of generated gears, where the contact between tool and blank is a point contact, but is apt to occur even in generated gears. It is the purpose of this invention to eliminate the initial shock of engagement of tool and blank, thus eliminating this possible cause of tool vibration.

The present invention proposes to obviate chatter by moving the cutting tool at a comparatively slow speed as it commences to cut so that the tool will engage the blank gradually and without shock. The speed of movement of the tool will be increased as it travels through the cut so that with the present invention there will be no substantial reduction in cutting time.

Figure 1:
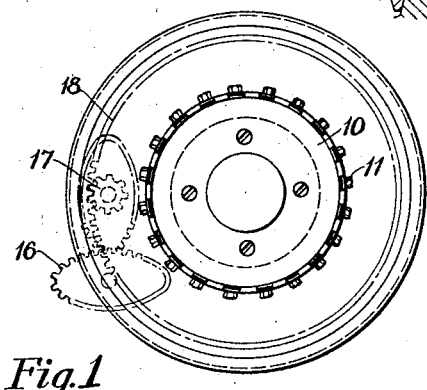
Figs. 1 and 2 are a front elevation and vertical sectional view, respectively, of a tool mechanism constructed according to one embodiment of my invention.
Figure 2:
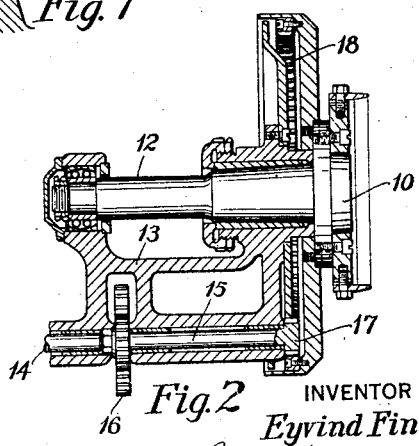

In the drawings, I have illustrated two embodiments of this invention. Referring first to Figs. 1 and 2, 10 indicates a cutting tool in the form of a rotary face mill provided with a plurality of cutting blades 11 and mounted upon the tool spindle 12 which is journaled in the cutter head support 13. According to my invention the tool 10 will be driven at varying speeds. These speeds will be so chosen that each cutting blade will commence cutting at a slow speed, thus eliminating any tendency towards shock and will travel across the blank at an increased speed to compensate for the momentary reduction in speed and to produce the tooth finish desired. To this end, the tool 10 is driven from the shaft 14 which may be operated from any suitable source of power through a pair of elliptical gears 16, one of which is secured to the shaft 14, and the other of which is keyed to a shaft 15 which is journaled in the cutter head support. The shaft 15 carries a pinion 17 which meshes with and drives the internal gear 18 which is secured to the cutter head.

Figure 3:
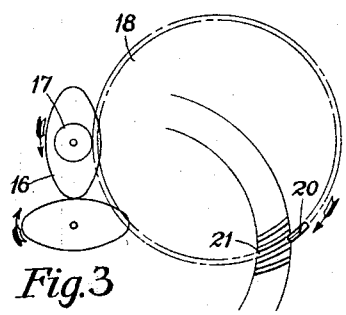
Figs. 3 and 4 are views illustrating diagrammatically the method of practising this invention.
Figure 4:
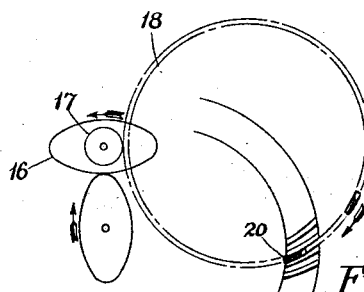

The elliptical gears 16 are so chosen and arranged and the gears 17 and 18 so proportioned that the tool will be traveling at a reduced speed as each cutting blade commences to cut, as shown diagrammatically in Fig. 3 where the blade 20 is just entering the tooth slot 21, and will travel at an increased speed as the tool passes through the cut. The position of the elliptical gears when the tool commences to cut and during the cut are shown in Figs. 3 and 4.

Figure 5:
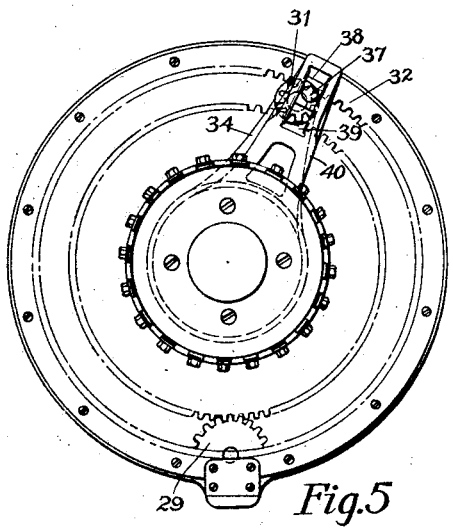
Figs. 5 and 6 are a front elevation and sectional view, respectively, of apparatus constructed according to another embodiment of this invention.
Figure 6:
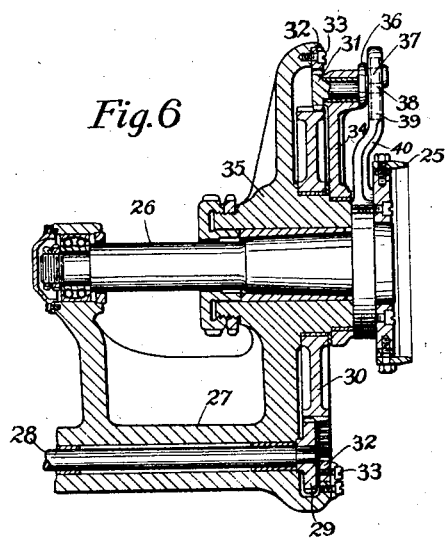

In Figs. 5 and 6 a further embodiment of the invention is illustrated in which the tool 25, also a rotary face mill provided with a plurality of blades, is shown mounted on a spindle 26 which is journaled in a cutter head support 27. The tool is driven from the shaft 28 which may be actuated from any suitable source of power. The shaft 28 carries a pinion 29 which meshes with a spur gear 30 which is journaled coaxial with the tool spindle and which meshes with and drives a pinion 31. The pinion 31 is also in mesh with a stationary internal gear 32 which is secured to the cutter head support 27, as by means of screws or bolts 33. The pinion 31 is journaled in an arm 34 which is mounted for rotation on the cutter head spindle bearing 35 and arranged coaxially of said spindle. The arbor or shank of the pinion 31 forms part of, or is secured to a crank disc member 36, carrying a pin 37 to which is secured a block 38 which is reciprocable in a slot 39 formed in an arm 40 which is secured to the cutter head 25. In operation the gear 30 will be driven from the shaft 28 by the pinion 29. The pinion 31 will be driven by the gear 30 and because of its mesh with the internal gear 32 will roll on the gear 30. As the pinion 31 travels it carries the arm 34 with it. The rotation and translation of this pinion and arm will cause the block 38 to slide back and forth in the slot 39 of the arm 40, thus alternately speeding up and reducing the speed of rotation of the cutter head. The gear ratio will be such that this alternate increase and decrease of speed will correspond to the number of cutting blades employed so that each cutting blade will commence to cut at a reduced speed whereby the shock of tool engagement will be eliminated.

In cutting curved tooth gears, it is customary to cut the teeth of at least one member of the pair one side at a time. That is, one side surface of all the teeth of the blank will be cut first, then the tool and blank will be reset relatively to each other to cut the other side surface. In cutting this member of the pair the cutting blades of the face mill are usually so arranged that alternate blades will cut on opposite side surfaces of the gear teeth. One side surface of all the teeth are cut with one set of blades and the tool and blank are then reset to cut the other side surface with the other set of blades of the teeth. When such a cutting tool is used in practising the present invention, it will not be necessary to vary the speed of tool rotation for each of the blades but only for each alternate blade as in any one tool adjustment only alternate blades will finish cut.

Figure 7:
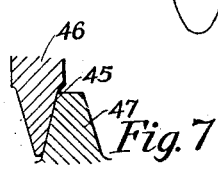
Fig. 7 is a diagrammatic view illustrating the engagement of a cutting tool with a non-generated gear blank.

The present invention is particularly adapted for the cutting of non-generated gears. In cutting these gears, the blank is held stationary and the cutting blade is moved across the face of the blank. At any instant the cutting blade has a line contact with the tooth surface being cut, as illustrated diagrammatically in Fig. 7, where the cutting edge 45 of the blade 46 is shown in contact with the whole side face of the tooth 47 being cut. There is, hence, a greater tendency toward tool vibration due to the shock of initial engagement in cutting non-generated gears than there is in cutting generated gears where the contact between tool and blank is a point contact only. Nevertheless vibration is apt to occur even in cutting generated gears and the present invention is therefor applicable to the production of both generated and non-generated gears.

With the present invention, it is intended that each cutting blade engage the blank at a relatively slow speed. The speed of the cutting blade as it crosses the face of the blank will depend upon the proportions and arrangement of the gears. This speed may either be continuously increased as the blade moves across the face of the blank, or increased and then diminished. The latter arrangement has the advantage particularly in cutting curved tooth gears, that the blade will leave the cut at a low speed whereby breakage of the corners is avoided.

While I have illustrated my invention with particular reference to the production of curved tooth gears, and in connection with a particular form of tool it is to be understood that it is applicable to the production of other types of gears also with other types of tools.

While I have described my invention in connection with a specific structure, it is to be understood that the invention is capable of various further modifications without departing from its scope and that this application is intended to cover any adaptations or embodiments following, in general, the principles of the invention and including such departures from the present disclosure as come within known or customary practise in the gear art and may be applied to the essential features hereinbefore set forth and as fall within the scope of the invention or the limits of the appended claims.

I claim:

1. In a gear cutting machine, a blank support, a rotary tool, and means for moving the tool and blank relatively to each other at varying velocities so that when the tool comes into engagement with the blank, the tool and blank are moving at a relatively slow speed, the speed being increased while the tool and blank are in engagement.

2. In a gear cutting machine, a blank support, a rotary tool and means for rotating the tool at varying velocities, so that the tool comes into engagement with the blank at a slow rotational speed, the speed being increased while the tool and blank are in engagement.

3. In a gear cutting machine, a blank support, a rotary tool provided with a plurality of cutting blades and means for moving the tool and blank relatively to each other at varying velocities such that when each cutting blade commences to cut, the tool and blank are moving at a relatively slow speed, the speed being increased while the tool and blank are in engagement.

4. In a gear cutting machine, a blank support, a rotary tool provided with a plurality of cutting blades, and means for rotating said tool at varying velocities so that each cutting blade will come into engagement with the gear blank at a relatively slow speed, the speed being increased while the tool and blank are in engagement.

5. In a gear cutting machine, a blank support, a rotary face mill provided with a plurality of annularly arranged cutting blades and means for moving the tool and blank relatively to each other at varying velocities such that when each cutting blade commences to cut, the tool and blank are moving at a relatively slow speed, the speed being increased while the tool and blank are in engagement.

6. In a gear cutting machine, a blank support, a rotary face mill provided with a plurality of annularly arranged cutting blades, and means for rotating said tool at varying velocities so that each cutting blade will engage the gear blank at a relatively slow speed, the speed being increased while the tool and blank are in engagement.

7. In a gear cutting machine, a blank support, a rotary face mill provided with a plurality of annularly arranged cutting blades, and gearing including a pair of elliptical gears for driving said tool at varying speeds, said gearing being so arranged and proportioned as to move the tool at a slow speed as each cutting blade engages the blank, and to increase the speed while the tool and blank are in engagement.

8. The method of producing gears which consists in moving a gear blank and a rotary tool relatively to each other at varying velocities so that when the tool comes into engagement with the blank, the tool and blank are moving at a relatively slow speed, the speed being increased while the tool and blank are in engagement.

9. The method of producing gears which consists in moving a gear blank and a rotary tool, provided with a plurality of cutting blades, relatively to each other at varying velocities so that when each cutting blade comes into engagement with the blank, the tool and blank are moving at a relatively slow speed, the speed being increased while the tool and blank are in engagement.

10. The method of producing longitudinally curved teeth on gears which consists in employing a face mill provided with a plurality of annularly arranged cutting blades and rotating said tool in engagement with the gear blank at varying velocities so that each cutting blade commences to cut at a slow speed, the speed being increased while the tool and blank are in engagement.

11. The method of producing longitudinally curved teeth on gears, which consists in moving a gear blank and a face mill provided with a plurality of annularly arranged cutting blades relatively to each other at varying velocities so that each cutting blade commences to cut while the tool and blank are moving at a relatively slow speed, the speed being increased while the tool and blank are in engagement.

EYVIND FINSEN.